US007934105B1

(12) United States Patent
Buckingham

(10) Patent No.: US 7,934,105 B1
(45) Date of Patent: Apr. 26, 2011

(54) DATA TRANSFER DEVICE

(75) Inventor: Jonathan Peter Buckingham, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 1186 days.

(21) Appl. No.: 11/494,780

(22) Filed: Jul. 26, 2006

(30) Foreign Application Priority Data

Oct. 11, 2005 (GB) .................................. 0520604.0

(51) Int. Cl.
*G06F 11/30* (2006.01)
*H04N 7/167* (2006.01)
(52) U.S. Cl. ....... 713/193; 713/161; 713/165; D14/360; D14/361; 380/201; 726/27; 726/28; 726/29; 726/30
(58) Field of Classification Search .................. 713/189, 713/193; 380/201
See application file for complete search history.

(56) References Cited

U.S. PATENT DOCUMENTS

| 5,235,641 | A | 8/1993 | Nozawa et al. |
| 5,535,279 | A | 7/1996 | Seestrom |
| 5,651,064 | A | 7/1997 | Newell |
| 5,757,908 | A | 5/1998 | Cooper et al. |
| 5,905,798 | A | 5/1999 | Nerlikar et al. |
| 5,970,147 | A | 10/1999 | Davis |
| 6,134,660 | A | 10/2000 | Boneh et al. |
| 6,343,282 | B1 | 1/2002 | Oshima et al. |
| 6,357,005 | B1 | 3/2002 | Devaux et al. |
| 6,378,007 | B1 | 4/2002 | Southwell |
| 6,381,662 | B1 | 4/2002 | Harari et al. |
| 6,381,706 | B1 * | 4/2002 | Zaczek ............................. 714/5 |
| 6,473,861 | B1 | 10/2002 | Stokes |
| 6,691,226 | B1 | 2/2004 | Frank et al. |
| 7,031,470 | B1 | 4/2006 | Bar-on |
| 7,181,624 | B2 * | 2/2007 | Asano et al. ................... 713/178 |
| 7,200,546 | B1 | 4/2007 | Nourmohamadian et al. |
| 7,278,016 | B1 | 10/2007 | Detrick et al. |
| 7,319,751 | B2 * | 1/2008 | Kirichenko ...................... 380/37 |
| 7,499,545 | B1 * | 3/2009 | Bagshaw ....................... 380/212 |
| 2003/0074319 | A1 * | 4/2003 | Jaquette .......................... 705/51 |
| 2003/0204717 | A1 | 10/2003 | Kuehnel |
| 2004/0101140 | A1 | 5/2004 | Abe |
| 2004/0107340 | A1 | 6/2004 | Wann et al. |

(Continued)

FOREIGN PATENT DOCUMENTS

EP 0 913 823 A2 10/1998

(Continued)

OTHER PUBLICATIONS

"Cryptostor Tape", NeoScale Systems, retrieved from http://www.neoscale.com/English/Products/cryptoStor_Tape.html on Nov. 29, 2005.

(Continued)

*Primary Examiner* — Taghi T Arani
*Assistant Examiner* — Mohammad L Rahman

(57) ABSTRACT

A data transfer device for storing data to a removable data storage item, wherein data are received as records and encrypted by the data transfer device prior to storage. The data transfer device encrypts a first portion of the records using a first encryption key and a second portion of the records using a second encryption key. The encrypted records are then stored to the removable data storage item as a plurality of data blocks, each data block comprising one or more encrypted records, wherein records in a respective data block are encrypted using only a respective one of the encryption keys.

10 Claims, 2 Drawing Sheets

U.S. PATENT DOCUMENTS

| | | |
|---|---|---|
| 2004/0190860 A1 | 9/2004 | Ishiguchi |
| 2004/0215955 A1 | 10/2004 | Tamai et al. |
| 2005/0071591 A1 | 3/2005 | Goodman et al. |
| 2005/0152670 A1* | 7/2005 | Skaar .............................. 386/46 |
| 2005/0198391 A1* | 9/2005 | Coldren ........................ 709/246 |
| 2005/0278257 A1 | 12/2005 | Barr et al. |
| 2006/0015946 A1 | 1/2006 | Yagawa |

FOREIGN PATENT DOCUMENTS

| | | |
|---|---|---|
| EP | 1 020 856 A2 | 7/2000 |
| EP | 1 185 020 A1 | 3/2002 |
| EP | 1 267 245 A2 | 12/2002 |
| EP | 1 333 353 A2 | 8/2003 |
| EP | 1 367 764 A2 | 12/2003 |
| EP | 1440439 | 7/2004 |
| EP | 1 585 006 A2 | 10/2005 |
| EP | 1 615 368 A1 | 1/2006 |
| GB | 2 264 373 A | 8/1993 |
| GB | 2 315 575 A | 2/1998 |
| GB | 2 330 682 A | 10/1999 |
| WO | 02/05482 A1 | 1/2002 |
| WO | 03/034425 A1 | 4/2003 |

OTHER PUBLICATIONS

Marisa, M., Tape Inscription Devices: Host/based vs. Appliance New Tape Measure, Storage and Server Technology, Retrieved Nov. 28, 2005 <http://www.networkcomputing.com/shared/artic/printFullArticleSrc.jhtml?articleID=173602939>.

"Cryptostore™ Tape—Enterprise Class Tape Protection Appliances," Neoscale Systems, pp. 1-3, http:www.neoscale.com/English/Products/CryptoStor_Tape.html.

"Cryptostore™ Tape 700 Family—Enterprise Class Tape Appliance," Neoscale Systems.

"Cryptostore™ for Tape-Storage Security Appliance for Backup," Neoscale Systems.

"Tape Encryption Devices: Host-Based vs. Appliance New Tape Measure," Sotrage and Server Technology Review, pp. 1-8, http://www.networkcomputing.com/shared/article/printFullArticleSrc.jhtml?articleID=173602939 (Nov. 28, 2005).

* cited by examiner

DATA TRANSFER DEVICE

FIELD OF THE INVENTION

The present invention relates to a data transfer device for storing data to a removable data storage item, in which data are encrypted by the data transfer device prior to storage.

BACKGROUND OF THE INVENTION

Data backup is a valuable tool in safeguarding important data. Data are generally backed-up onto removable data storage items, such as tape cartridges or optical discs, such that the backup data may be stored at a different geographical location to the primary data.

By storing important data onto removable data storage items, security issues become a consideration. For example, a visitor to a site might easily pocket a tape cartridge storing large amounts of commercially sensitive data.

Many backup software packages provide the option of encrypting data prior to backup. Software encryption increases the time required to backup data and consumes valuable computer resources.

SUMMARY OF THE INVENTION

The present invention provides a data transfer device for storing data to a removable data storage item, the data transfer device being operable to: receive data to be stored as a plurality of records, each record having an indeterminate size; encrypt a first portion of the records using a first encryption key and encrypt a second portion of the records using a second encryption key, each of the first portion and the second portion comprising an integral number of records; and store the encrypted records to the removable data storage item as a plurality of data blocks, each data block comprising one or more encrypted records, wherein records in a respective data block are encrypted using only a respective one of the encryption keys.

Preferably, the data transfer device is operable to store the encrypted first portion of records as a one or more data blocks, and to store the encrypted second portion of records as one or more additional data blocks.

Conveniently, the data transfer device is operable to pad a partial data block with redundant data to the predetermined size.

Advantageously, the data transfer device is operable to receive a designated encryption key in respect of a designated portion of records.

Preferably, the data transfer device includes a memory for storing an encryption key, and the data transfer device is operable to: store the first encryption key in the memory; receive the second encryption key; store the second encryption key in the memory in place of the first encryption key; and encrypt the records to be stored using the encryption key stored in the memory.

Conveniently, the data transfer device is operable to pad a partial data block comprising records encrypted using the first encryption key with redundant data to the predetermined size in response to receiving the second encryption key.

Advantageously, the data transfer device is operable to encrypt the records using block encryption, and to encrypt each record using a different initialisation vector.

Preferably, the data transfer device is a tape drive and the removable data storage item is a tape cartridge.

Another aspect of the invention provides a data transfer device for storing data to a removable data storage item, the data transfer device comprising: means for receiving data to be stored as a plurality of records, each record having an indeterminate size; means for encrypting a first portion of the records using a first encryption key and for encrypting a second portion of the records using a second encryption key, each of the first portion and the second portion comprising an integral number of records; and means for storing the encrypted records to the removable data storage item as a plurality of data blocks, each data block comprising one or more encrypted records, wherein records in a respective data block are encrypted using only a respective one of the encryption keys.

Preferably, the means for storing stores the encrypted first portion of records as one or more data blocks, and the encrypted second portion of records as one or more additional data blocks.

Conveniently, the data transfer device comprises means for padding a partial data block with redundant data to the predetermined size.

Advantageously, the data transfer device comprises: means for storing the first encryption key; means for receiving the second encryption key; and means for storing the second encryption key in place of the first encryption key, and the means for encrypting the records uses the encryption key stored in the memory.

Preferably, the data transfer device is operable to pad a partial data block comprising records encrypted using the first encryption key with redundant data to the predetermined size in response to receiving the second encryption key.

Conveniently, the means for encrypting encrypts the records using block encryption, and encrypts each record using a different initialisation vector.

A further aspect of the invention provides a method of storing data to a removable data storage item, the method comprising: receiving data to be stored as a plurality of records, each record having an indeterminate size; encrypting a first portion of the records using a first encryption key and encrypting a second portion of the records using a second encryption key, each of the first portion and the second portion comprising an integral number of records; and storing the encrypted records to the removable data storage item as a plurality of data blocks, each data block having a predetermined size and comprising one or more encrypted records, wherein records in a respective data block are encrypted using only a respective one of the encryption keys.

Preferably, the method comprises padding a partial data block with redundant data to the predetermined size.

Advantageously, the method comprises padding a partial data block with redundant data to the predetermined size in response to receiving an encryption key.

Conveniently, the method comprises receiving the second encryption key and padding a partial data block comprising records encrypted using the first encryption key with redundant data to the predetermined size in response to receiving the second encryption key.

In a still further aspect, the present invention provides a computer program product storing computer program code executable by a data transfer device, the computer program product when executed causing the data transfer device to operate as described in the aforementioned aspects of the invention, or to perform the aforementioned methods.

BRIEF DESCRIPTION OF THE DRAWINGS

In order that the present invention may be more readily understood, embodiments thereof will now be described, by way of example, with reference to the accompanying drawings, in which.

DETAILED DESCRIPTION

In tape formats such as linear tape-open (LTO) and digital data storage (DDS), data are stored to tape as a plurality of data blocks. In LTO the data blocks are referred to as data sets, whilst in DDS the data blocks are referred to as groups. Each data block comprises compressed data to which error correction codes (ECC) are appended. Consequently, each data block may be regarded as a distinct entity having its own compression dictionary and error correction codes.

In both LTO and DDS formats, a tape drive receives data from a host device as one or more records. The records are formatted, compressed and packed by the tape drive to form a compressed data stream. The compressed data stream is then divided into chunks of data having the same predetermined size. An information table is then appended to each chunk of data to create a data block, i.e. a data set (LTO) or group (DDS).

An embodiment of the present invention will now be described with reference to the LTO format. However, the present invention may be equally applied to other formats in which data are stored as data blocks, each data block comprising one or more records.

Figure 1:
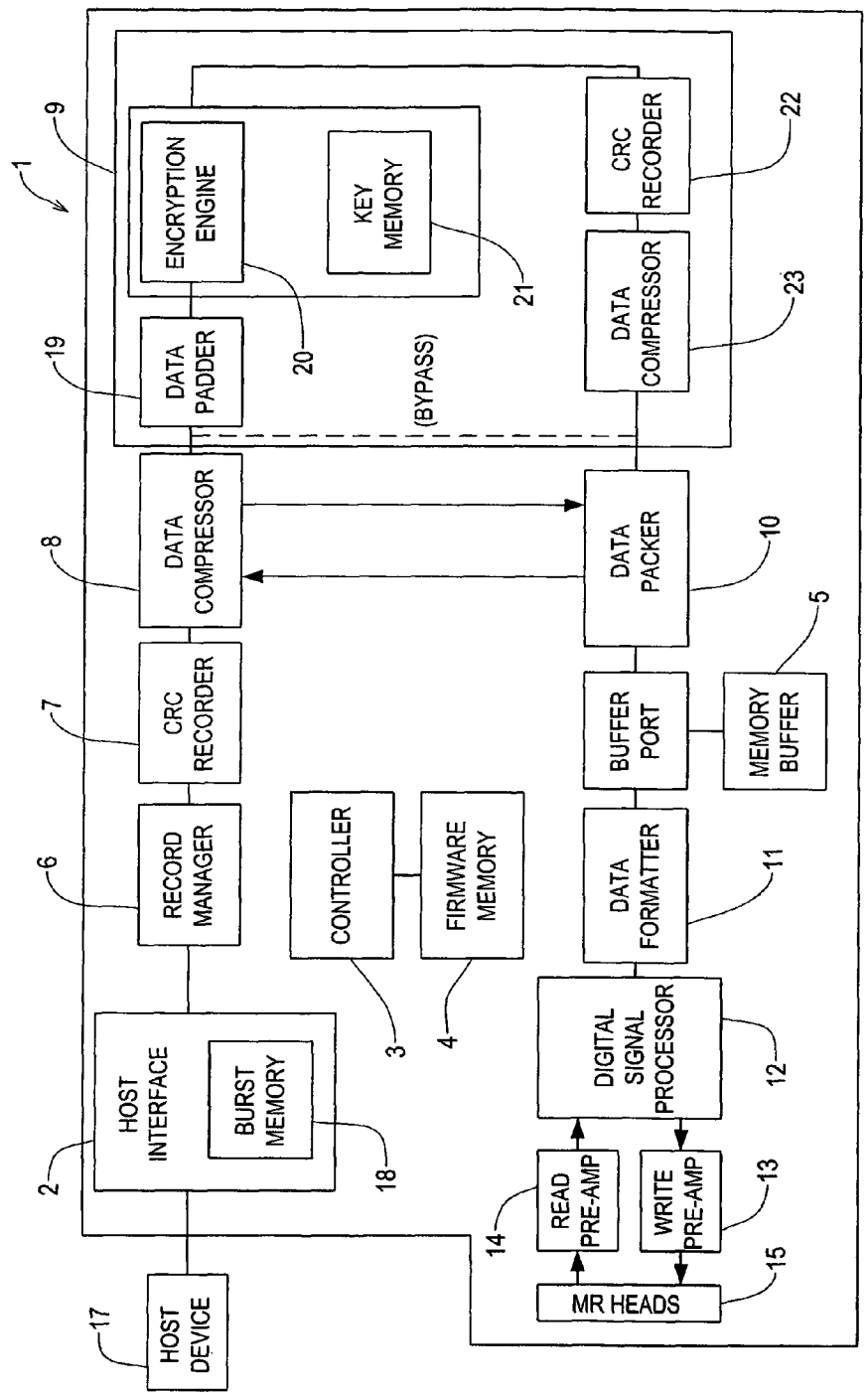
FIG. 1 is a schematic block diagram of a tape drive embodying the present invention.

The tape drive 1 of FIG. 1 comprises a host interface 2, a controller 3, a firmware memory 4, a memory buffer 5, a record manager 6, a CRC recorder 7, a data compressor 8, a data encryptor 9, a data packer 10, a data formatter 11, a digital signal processor 12, write 13 and read 14 pre-amplifiers, and magneto-resistive heads 15. With the exception of the data encryptor 9 and the software stored in the firmware memory 4, the components of the tape drive 1 are identical to those employed in conventional LTO tape drives.

The host interface 2 controls the exchange of data between the tape drive 1 and a host device 17. Control signals received from the host device 17 by the interface 2 are delivered to the controller 3, which, in response, controls the operation of the tape drive 1. Data received from the host device 17 typically arrives in high speed bursts and the host interface 2 includes a burst memory 18 for storing data received from the host device 17.

The controller 3 comprises a microprocessor, which executes instructions stored in the firmware memory 4 to control the operation of the tape drive 1.

The record manager 6 retrieves data from the burst memory 18 of the host interface 2 and appends record boundaries. The CRC recorder 7 then appends a cyclic redundancy check (CRC) to each record. Each of the protected records is then compressed by the data compressor 8 using LTO scheme-1 (ALDC) compression. The CRCs are not checked until restore when they are checked by a CRC recorder just before the data is sent to the host interface 2. The compressed records are then delivered to the data encryptor 9.

The data encryptor 9 comprises a data padder 19, an encryption engine 20, a key memory 21, a CRC recorder 22 and a data compressor 23. The CRC recorder 22 and data compressor 23 of the data encryptor 9 shall be referred to hereafter as the encrypt CRC recorder 22 and encrypt data compressor 23 so as to distinguish them from the other CRC recorder 7 and data compressor 8.

As described below, the data encryptor 9 employs block encryption, each block having 128 bits. The data padder 19 therefore appends an end-of-record (EOR) codeword to each compressed record and pads each compressed record with redundant data (e.g. with zeros) such that each compressed record is an integral number of 128 bits.

The encryption engine 20 employs a Galois/Counter Mode (GCM) encryption algorithm to encrypt each padded, compressed record. The key memory 21 may be volatile or non-volatile, depending on the intended applications of the tape drive 1, and stores a 256-bit encryption key that is used by the encryption engine 20. Other keys such as a 128 or a 192 bit key may also be used. The Galois/Counter Mode is specified in "The Galois/Counter Mode of Operation" by David A. McGrew and John Viega available from NIST/CSRC.

The encryption engine 20 divides each padded, compressed record into blocks of 128 bits. Each block is then encrypted using a different pair (for each block) of: the encryption key held in key memory 21; and a counter value.

After data encryption, the encryption engine 20 appends an initialisation vector (sometimes referred to as an initial vector) to the beginning of the blocks of ciphertext and an authentication tag to the end of the blocks of ciphertext to create a pseudo-record. The initialisation vector is the counter value for the first block of ciphertext of the pseudo-record (i.e. block number=0), whilst the authentication tag is generated in accordance with the GCM specification and comprises a form of checksum generated over the data of a record. The tag may also be generated over any additional authenticated data (AAD) which may or may not be prefixed to records. The tag, MD and prefixing MD to records are all concepts enshrined in the GCM and IEEE1619.1 standards. Please note that during restore, a tag is regenerated over the record and over any AAD and checked with the tag previously generated.

The pseudo-record, comprising the IV, blocks of ciphertext and authentication tag, is delivered to the encrypt CRC recorder 22, which appends a CRC to the pseudo-record to create a protected pseudo-record. The protected pseudo-record is then delivered to the encrypt data compressor 23, which compresses the protected pseudo-record using LTO scheme-2 (no-compress) compression. Owing to encryption, the pseudo-record comprises random data and therefore the pseudo-record is incompressible. It is for this reason that scheme-2 compression is employed. Although no compression is actually achieved, the compressed pseudo-record consists of LTO codewords (e.g. compression, scheme and reset codewords). Consequently, the compressed pseudo-record is LTO compliant.

The compressed pseudo-record is then delivered to the data packer 10, which appends an EOR codeword to the compressed pseudo-record and packs sequential compressed pseudo-records together to form a compressed data stream, which is then written to the memory buffer 5.

Figure 2:
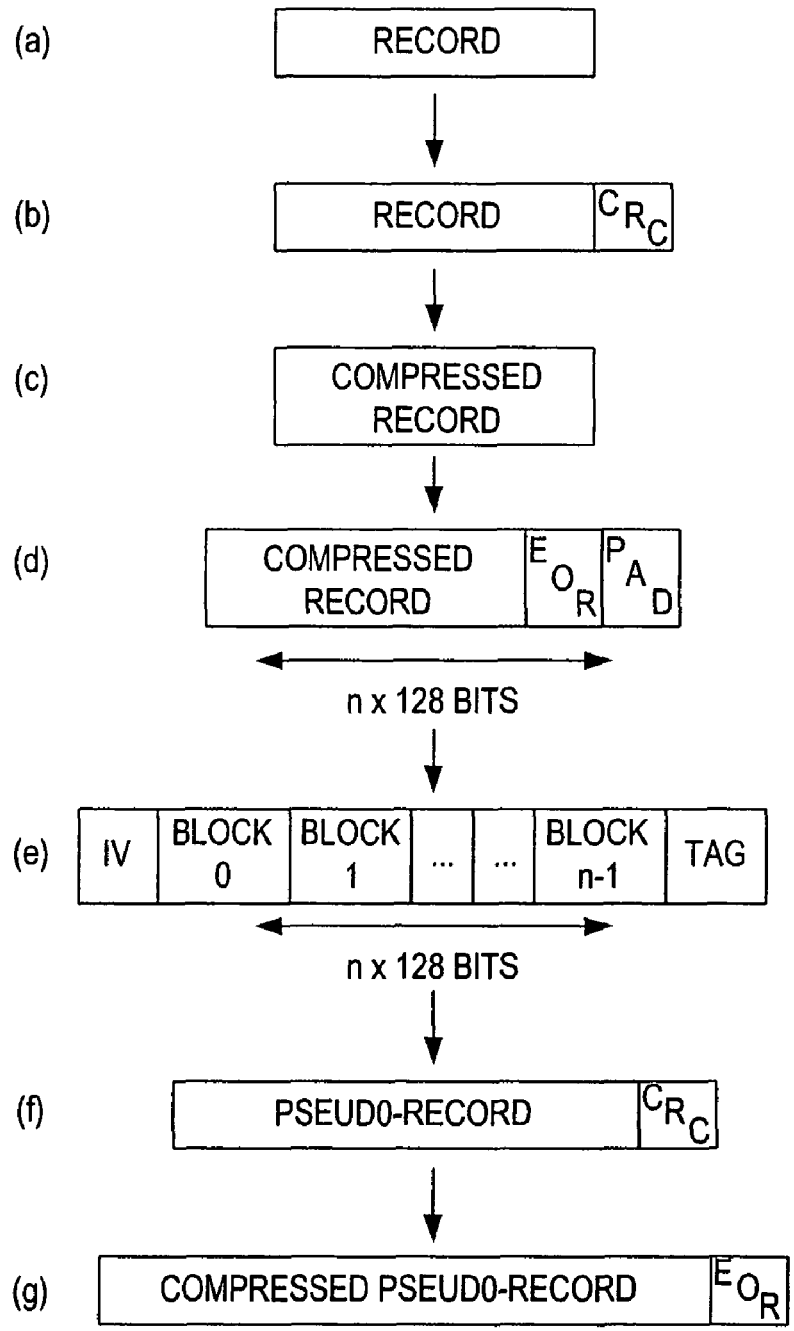
FIG. 2 illustrates a record at various stages of formatting by the tape drive of FIG. 1.

FIG. 2 illustrates a record received from the host device 17 at various stages of formatting by the tape drive 1. FIG. 2(a) illustrates the record as received by the tape drive 1, which may be of any size. FIG. 2(b) illustrates the record after processing by the CRC recorder 6, and FIG. 2(c) illustrates the protected record after compression by the data compressor 7. FIG. 2(d) illustrates the compressed record after formatting by the data padder 19. FIG. 2(e) illustrates the pseudo-record created after encryption. FIG. 2(f) illustrates the pseudo-record after processing by the encrypt CRC recorder 22, and FIG. 2(e) illustrates the protected pseudo-record after compression by the encrypt data compressor 23 and the data packer 10. LTO format specifies also that records must be padded to a 32 bit boundary hence the potential use of a 4-byte pad appended to the end of the pseudo-record.

As in conventional LTO tape drives, the controller 3 then divides the compressed data stream into data chunks of a predetermined size (e.g. 403884 bytes for LTO1/LTO2 and 1616940 for LTO3/LTO4) which includes a data set information table (DSIT) of 468 bytes for LTO1/LTO2/LTO3/LTO4) appended to each data chunk to create a data set. Each data set is then delivered to the data formatter 11, which ECC-encodes the data set, randomises the ECC-encoded data to remove long sequences, and RLL encodes the randomised data. The RLL-encoded data are then processed by the digital signal processor 12 and delivered, via the write pre-amplifier 13, to write head elements 15 which write the data set to a magnetic tape.

The read process is basically the reverse of the write process. In response to a request to retrieve a particular record, the tape drive 1 first locates the relevant data set or group of data sets. The data set is then read from the tape by read head elements 16 which generate an analogue signal. The analogue signal is then amplified by the read pre-amplifier 14 and processed by the digital signal processor 12 to generate a digital data stream. The digital data stream is then RLL-decoded, unscrambled and ECC-decoded by the data formatter 11 to create the data set.

The chunk of data corresponding to the data region of the data set is then delivered to the data packer 10, which unpacks the chunk of data to create one or more compressed pseudo-records. The location of each compressed pseudo-record is determined by the EOR codewords previously appended by the data packer 10 during data storage.

Each compressed pseudo-record is then decompressed by means of the encrypt data compressor 23. The CRC appended to each pseudo-record is discarded by the encrypt data compressor 23 and the resulting pseudo-records are delivered to the encryption engine 20, which then decrypts the pseudo-records. The encryption engine 20 uses the encryption key stored in key memory 21 and the initialization vector stored at the beginning of each pseudo-record to decrypt the pseudo-records and generate in response padded, compressed records.

The padded, compressed records are then delivered to the data compressor 8, which decompresses the records. Owing to the presence of the EOR codeword, the data compressor 8 ignores any padding to the compressed records.

The controller 3 reads each of the retrieved records in turn until the requested record is identified, whereupon it is delivered to the host device 11 via the host interface 2.

The tape drive 1 is additionally operable to receive a new encryption key from the host device 11. Accordingly, data stored to tape by the tape drive 1 may be encrypted using a plurality of different encryption keys so as to further increase data security.

Receipt of the new encryption key may occur at any time, including during a data write to tape. When received by the tape drive 1, the new encryption key is stored in the key memory 21, replacing the previously stored encryption key. All future records received by the tape drive 1 from the host device 17 are then encrypted using the new encryption key.

In response to receiving the new encryption key, the controller 3 pads the current, partial chunk of data to its end, i.e. the controller 3 appends an end-of-marker codeword followed by redundant data to the end of the current data chunk such that the data chunk is of the necessary, predetermined size (403884 bytes for LTO1/LTO2 and 1616940 for LTO3/LTO4) again including the DSIT which is appended to the padded data chunk to create the data set.

Without padding the current data set, a data set would comprise records encrypted using different encryption keys. As noted above, in order to retrieve a particular record, it is necessary to decrypt each record within a data set. If a data set comprises records that have been encrypted using different encryption keys, it would be necessary to provide all of the encryption keys in order to locate and retrieve a particular record. Padding the current data set in response to a change in encryption key ensures that all records within a data set are encrypted using the same encryption key. Consequently, locating and retrieving a particular record is made much simpler since it is guaranteed that only one encryption key need be provided in order to locate and retrieve the record.

In the embodiment described above, the data compressor 8 and encrypt data compressor 23 are provided as separate components. However, since both data compressors 8,23 employ LTO compression, they may be provided as a single component. Alternatively, whilst the data compressor 8 employs LTO scheme-1 compression to compress the records prior to encryption, alternative lossless compression algorithms may be equally employed. Moreover, compression prior to encryption, whilst advantageous, it is not essential and may be omitted.

Although an embodiment of the present invention has been described with reference to the LTO format, the present invention is equally applicable to other formats in which records are stored to tape as a plurality of data blocks. In particular, the pseudo-records created by the encryption engine 20 can be formatted as conventional records using alternative formats, such as DDS.

Whilst the data encryptor 9 employs a Galois Counter Mode encryption algorithm, other encryption algorithms may alternatively be employed, including block cipher, stream cipher, symmetric and asymmetric encryption. In the case of asymmetric encryption, the key memory 21 stores a decryption key in addition to the encryption key.

Although an embodiment of the present invention have been described with reference to a tape drive 1, it will be appreciated that the present invention is equally applicable to other types of data transfer devices, such as optical drives, in which data are stored as data blocks, each data block comprising one or more records, or indeed in the case of very long records, a part of a record spanning more than one data block.

It should be appreciated that a data block in the LTO format can be recognised as comprising a block of data which starts with an access point, access points being the first record boundary in a dataset and comprising a position from which compression histories and dictionaries are reset. Importantly, again, within a data block embodying the invention—signified as such by starting with an access point, the same encryption key is used throughout the data block so that only the one key is needed to decrypt the data block.

With the data transfer device embodying the present invention, the encryption and decryption of backup data is moved from the host device to the data transfer device. The data transfer device need not rely upon special commands or control signals in order to encrypt or decrypt data, but may instead encrypt and decrypt data in response to conventional read and write commands received from the host device. Accordingly, the data transfer device is capable of operating using standard hardware interfaces such as SCSI, PCI, IDE, EISA, USB, FireWire®, Bluetooth®, IrDA etc. Moreover, in forcing a new data block (e.g data set in LTO or group in DDS) to be created in response to a change in encryption key, the data transfer device ensures that each data block comprises only records encrypted using the same encryption key. Consequently, data may be more securely stored to tape through the use of multiple encryption keys without unduly complicating the process of data retrieval.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. A tape drive for storing data to a tape cartridge, the tape drive being operable to:
    receive, from a host in communication with the tape drive, data to be stored as a plurality of records, each record having an indeterminate size;
    encrypt at the tape drive a first portion of the records using a first encryption key and encrypt at the tape drive a second portion of the records using a second encryption key, each of the first portion and the second portion comprising an integral number of records;
    store the encrypted records to the tape cartridge as a plurality of data blocks, each data block having a predetermined size and comprising one or more encrypted records, wherein records in a respective data block are encrypted using only a respective one of the first and second encryption keys;
    receive, from the host, the second encryption key;
    in response to receiving the second encryption key, pad a current partial chunk of data of the first portion so the partial chunk of data has a predetermined size and so each of the records is encrypted with a single encryption key;
    replace the first encryption key with the second encryption key;
    encrypt records to the tape cartridge with the second encryption key.

2. The tape drive according to claim 1, wherein the tape drive is operable to:
    in response to receiving the second encryption key, append an end-of-marker codeword followed by redundant data to an end of a current data chunk so the current data chunk has a predetermined size and so records within a data set are encrypted using a same encryption key.

3. The tape drive according to claim 1, wherein the tape drive is operable to:
    store the first encryption key in the memory;
    receive the second encryption key;
    store the second encryption key in the memory in place of the first encryption key; and
    encrypt the records using the second encryption key stored in the memory.

4. The tape drive according to claim 1, wherein the tape drive is operable to pad a partial data block comprising records encrypted using the first encryption key with redundant data to the predetermined size in response to receiving the second encryption key.

5. The tape drive according to claim 1, wherein the tape drive is operable to encrypt the records using block encryption, and to encrypt each record using a different initialisation vector.

6. The tape drive according to claim 1, wherein the first and second encryption keys are received at the tape drive from the host, and the data is encrypted with a plurality of different encryption keys to increase data security.

7. A tape drive for storing data to a tape cartridge, the tape drive comprising:
    means for receiving from a host data to be stored as a plurality of records, each record having an indeterminate size;
    means for encrypting at the tape drive a first portion of the records using a first encryption key and for encrypting at the tape drive a second portion of the records using a second encryption key, each of the first portion and the second portion comprising an integral number of records;
    means for storing the encrypted records to the tape cartridge as a plurality of data blocks, each data block having a predetermined size and comprising one or more encrypted records;
    means for receiving, from the host, the second encryption key;
    in response to receiving the second encryption key, means for padding a current partial chunk of data of the first portion so the partial chunk of data has a predetermined size and so each of the records is encrypted with a single encryption key;
    means for replacing the first encryption key with the second encryption key;
    means for encrypting records to the tape cartridge with the second encryption key.

8. The tape drive according to claim 7, wherein the means for storing stores the encrypted first portion of records as one or more data blocks, and the encrypted second portion of records as one or more additional data blocks.

9. The tape drive according to claim 7, wherein the means for encrypting encrypts the records using block encryption, and encrypts each record using a different initialisation vector.

10. A method of storing data to a removable tape cartridge, the method comprising:
    receiving, at a tape drive from a host, data to be stored as a plurality of records, each record having an indeterminate size;
    encrypting at the tape drive a first portion of the records using a first encryption key and encrypting at the tape drive a second portion of the records using a second encryption key, each of the first portion and the second portion comprising an integral number of records;
    storing the encrypted records to the tape cartridge as a plurality of data blocks, each data block having a predetermined size and comprising one or more encrypted records, wherein records in a respective data block are encrypted using only a respective one of the first and second encryption keys;
    receiving, from the host, the second encryption key;
    in response to receiving the second encryption key, padding a current partial chunk of data of the first portion so the partial chunk of data has a predetermined size and so each of the records is encrypted with a single encryption key;
    replace the first encryption key with the second encryption key; and
    encrypt records to the tape cartridge with the second encryption key.

* * * * *